Aug. 14, 1928.
H. R. BLISS
SUIT BOX
Filed Nov. 5, 1925 6 Sheets-Sheet 1
1,680,932
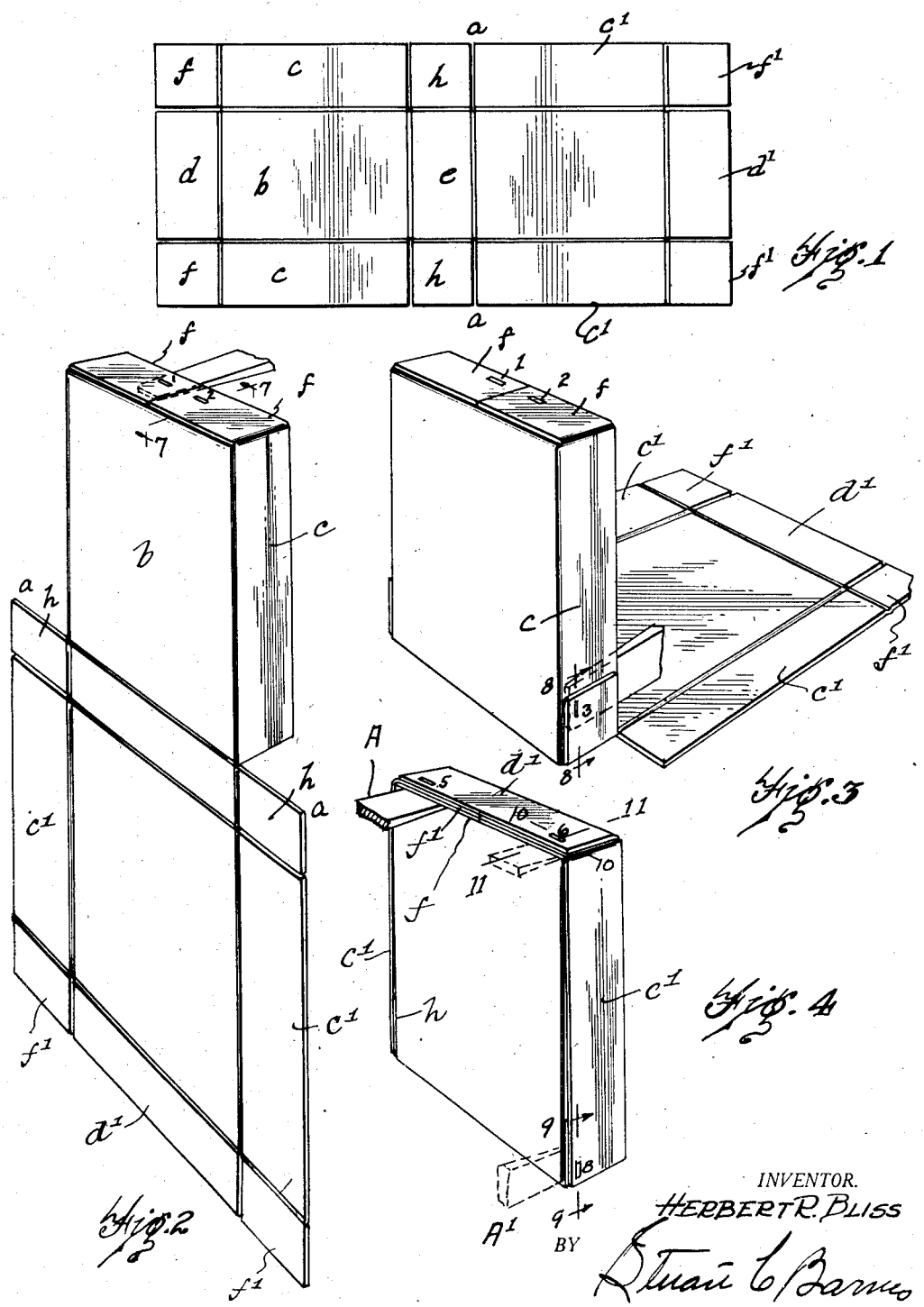
INVENTOR.
HERBERT R. BLISS
BY
Stuart C. Barnes
ATTORNEY.

Aug. 14, 1928.

H. R. BLISS 1,680,932

SUIT BOX

Filed Nov. 5, 1925

INVENTOR.
HERBERT R. BLISS
BY
Stuart C. Barnes
ATTORNEY.

Aug. 14, 1928.

H. R. BLISS 1,680,932

SUIT BOX

Filed Nov. 5, 1925    6 Sheets-Sheet 3

INVENTOR.
HERBERT R. BLISS
BY
ATTORNEY.

Aug. 14, 1928.     H. R. BLISS     1,680,932
SUIT BOX
Filed Nov. 5, 1925     6 Sheets-Sheet 4

INVENTOR.
Herbert R. Bliss.
BY
Stuart C. Barnes
ATTORNEY.

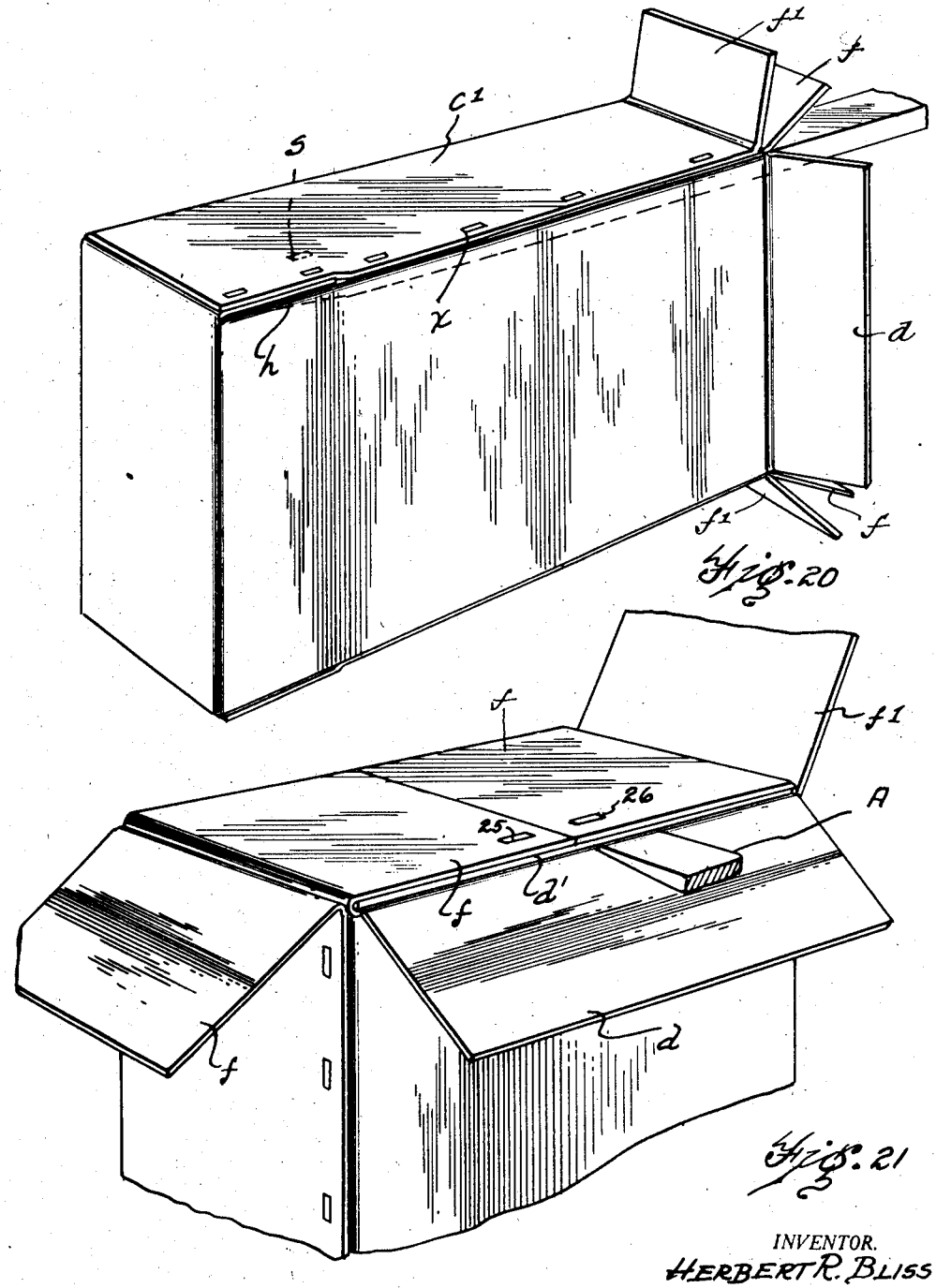

Aug. 14, 1928.

H. R. BLISS 1,680,932

SUIT BOX

Filed Nov. 5, 1925      6 Sheets-Sheet 6

INVENTOR.
HERBERT R. BLISS
BY
*Stuart C. Barnes*
ATTORNEY.

Patented Aug. 14, 1928.

1,680,932

UNITED STATES PATENT OFFICE.

HERBERT R. BLISS, OF NIAGARA FALLS, NEW YORK, ASSIGNOR TO BLISS CONTAINERS, INC., OF NIAGARA FALLS, NEW YORK, A CORPORATION OF NEW YORK.

SUIT BOX.

Application filed November 5, 1925. Serial No. 66,973.

This invention relates to a new form of box and the method of assembling and sealing the same. It is particularly directed to a clothes and suit box. It is customary now to use for clothes and suits a box that has two telescoping sections. The two telescoping sections are made of flat blanks that are folded up and stitched together by the box sales house. They are then delivered to the customer in trucks and drays already set up. We are referring to the clothes and suit box that is intended for shipments of these articles as by express. The clothing or suit customer packs his goods in a box and ties the box sections together with suitable cord. There is also ordinarily applied a seal to indicate that the contents have not been tampered with. The draying and trucking of these empty boxes already set up is unnecessarily expensive and very often attended with inconvenient delays in large cities where traffic jams are frequent. It is an unusually uneconomical way of taking care of this problem, for obviously only relatively small loads of empty boxes can be carried when the boxes are all set up, due to their great bulk.

It is the object of the present invention to afford a type of box which can be delivered to the clothing customer in flat blank form and can be set up by him with the aid of a small foot operated stitcher, and which may also be sealed by the same stitcher with a minimum number of stitches. This completely eliminates the necessity of tying and sealing these boxes, and also eliminates a large amount of useless trucking, and also enables the customer to carry a large amount of box material in stock, so he is not dependent upon frequent deliveries from the box dealers.

Referring to the drawings:

Fig. 1 is a plan view of the blank of the perfect form of box.

Fig. 2 shows the first operations of setting up the box.

Fig. 3 is a perspective view showing the second operation in setting up the box.

Fig. 4 is a perspective view showing the third and fourth operations.

Figs. 20 to 23 are perspective views showing how the box can be sealed by stitching it along both entire sides and then stitching together the ends.

Preferably a single blank is used, such as shown in Fig. 1. This blank involves no waste whatever of material. The line $a$—$a$ is the hinging line between the body and the cover. The body is made up of the bottom wall $b$, two side walls $c$ and the end walls $d$ and $e$, and the corner flaps $f$—$f$ and $h$—$h$. It will be seen that as shown the corner flaps $f$—$f$ are hinged to the side walls $c$—$c$, but obviously they might be hinged to the end wall $d$ and divided from the side walls $c$—$c$. These corner flaps $f$—$f$ are turned over the end walls $d$ on the outside when the end wall $d$ and the side wall $c$—$c$ are folded up. The stitches 1 and 2 are then taken, as shown in Fig. 2. The corner flaps $h$ are then folded over the side walls $c$—$c$ and the stitches 3 are taken, as indicated in Fig. 3. The box is now ready for packing.

Figure 5:
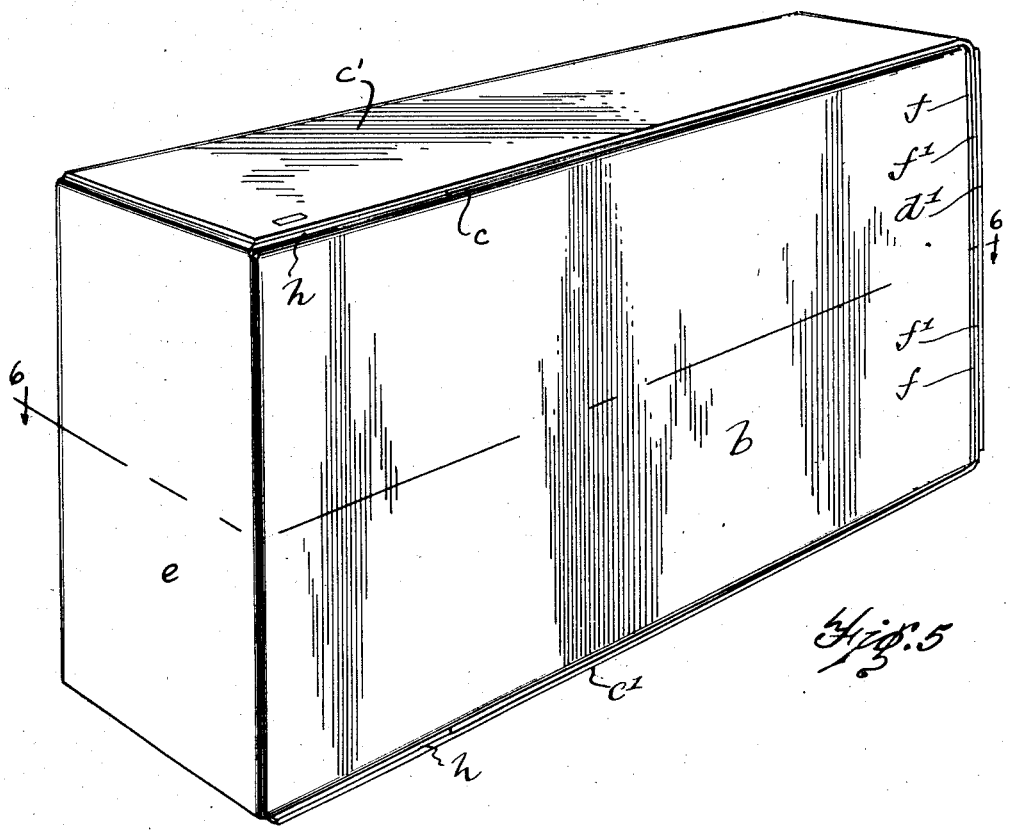
Fig. 5 is a perspective view of the completed box.
Figure 6:
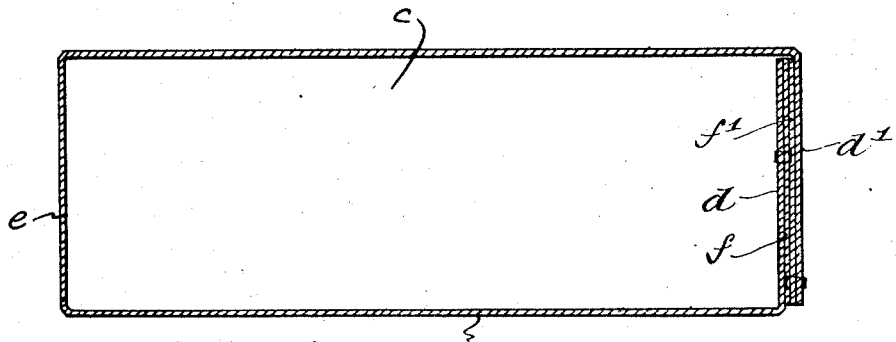
Fig. 6 is a section on the line 6—6 of Fig. 5.
Figure 7:
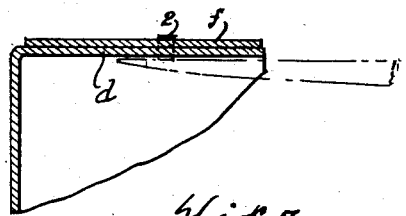
Fig. 7 is a section on the line 7—7 of Fig. 2.
Figure 8:
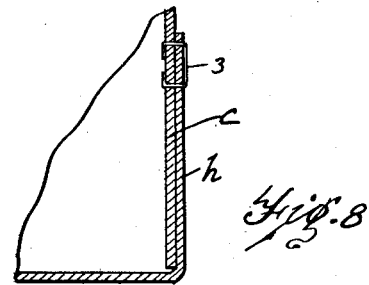
Fig. 8 is a section on the line 8—8 of Fig. 3.
Figure 9:
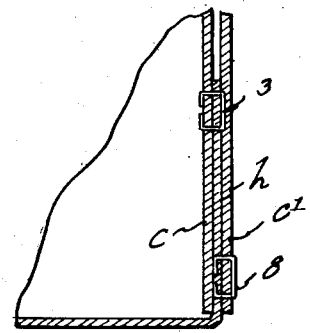
Fig. 9 is a section on the line 9—9 of Fig. 4.
Figure 10:
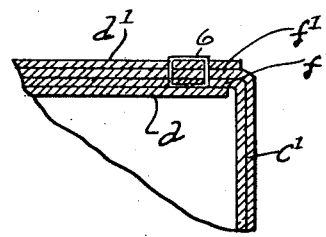
Fig. 10 is a section on the line 10—10 of Fig. 4.
Figure 11:
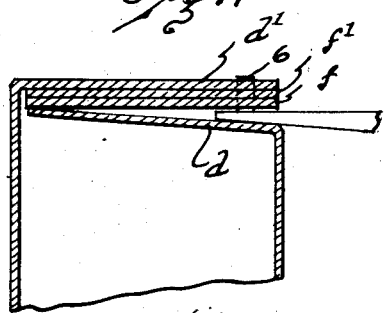
Fig. 11 is a section on the line 11—11 of Fig. 4.
Figure 12:
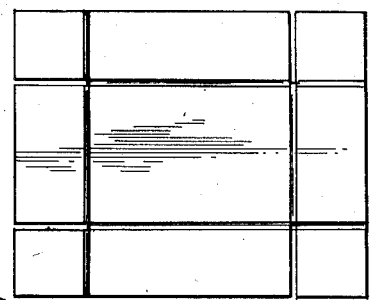
Fig. 12 is a plan view of the blank of a modified form of the invention.
Figure 13:
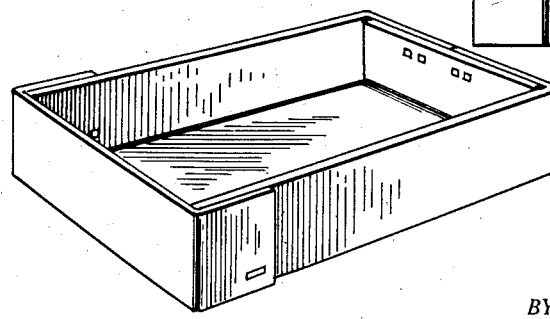
Fig. 13 is a perspective of the body of such modified form of box set up.
Figure 14:
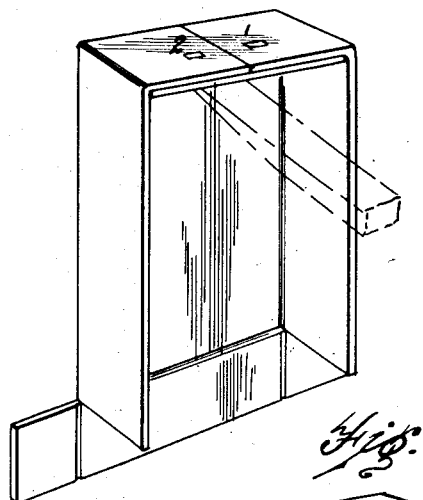
Figs. 14 and 15 are perspective views showing how this form of the box is set up.
Figure 15:
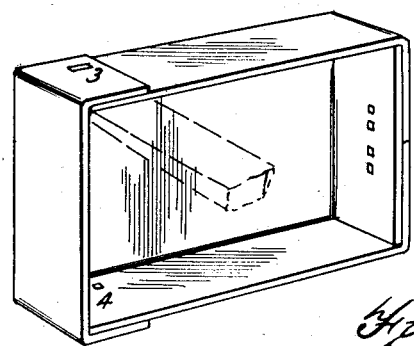
Figure 16:
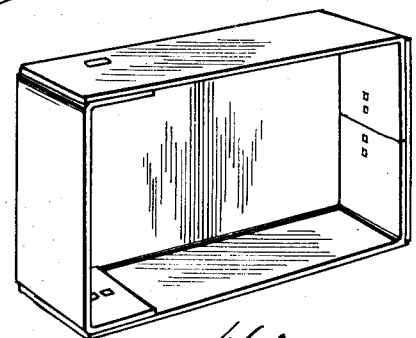
Fig. 16 is a perspective view of the cover of the modified form of the box.
Figure 17:
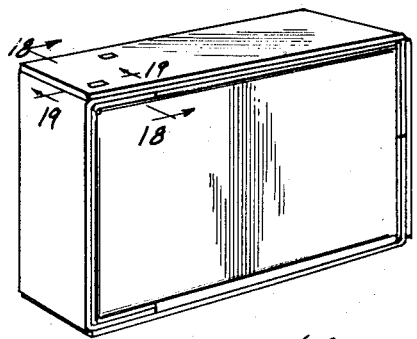
Fig. 17 is a perspective of the completed and sealed box of the modified type.
Figure 19:
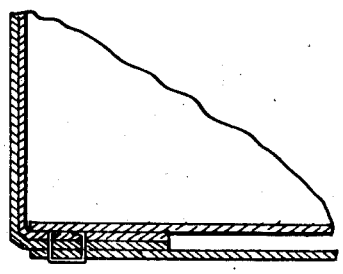
Figs. 18 and 19 are sections taken on the corresponding section line of Fig. 17.
Figure 18:
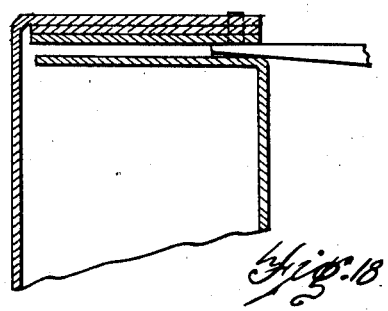

When the box is packed, the cover may be thrown down over the opening in the body of the box, and the corner flaps *f—l*, the end wall *d—l* together with the side walls *c—l* folded down over the body of the box, as clearly shown in Fig. 4. Anvil A then may be inserted under the three thicknesses of flaps, the anvil going in between the corner flaps *f* and the end wall *d* in the spaces left at the side of the stitches 1 and 2. This is clearly shown in Fig 11; the stitches 5 and 6 are thus taken. This completes the sealing of the case at the ends. Then the anvil is inserted as shown at A—1 in Fig. 4, and stitches 8 taken. It will be seen from Fig. 9 that the anvil is inserted in between the corner flap *h* and the side wall *c*, and the corner flap *h* is stitched to the cover side wall *c—l*. This completes the sealing of the box and also the set up, and makes an unusually strong box which the customer can set up and seal with a minimum number of wire stitches by means of a special foot controlled stitching machine with a blade anvil.

Now, referring to Figs. 12 to 17, substantially the same box may be made of two blanks, but here more material is required as two sets of corner flaps in place of one set is required and two end walls similar to the end wall *e*. Of course, the body and the cover would be separately stitched, as it is clearly indicated in these figures, but the sealing would be done in the same way as already described in connection with the one blank box.

Figure 22:
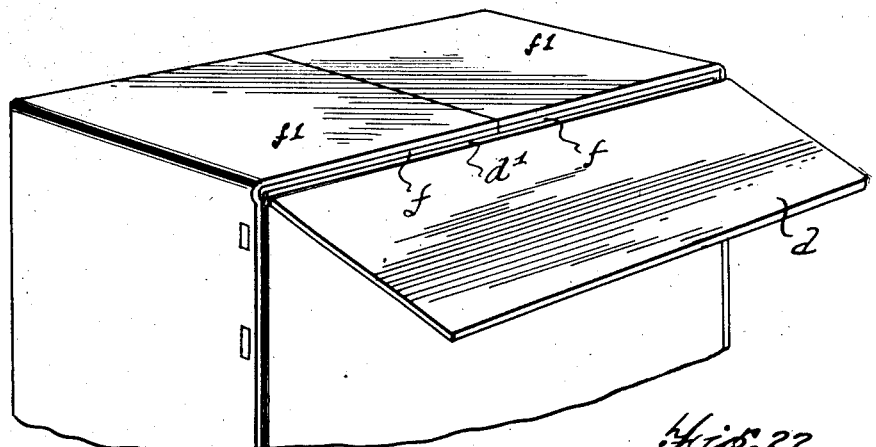
Figure 23:
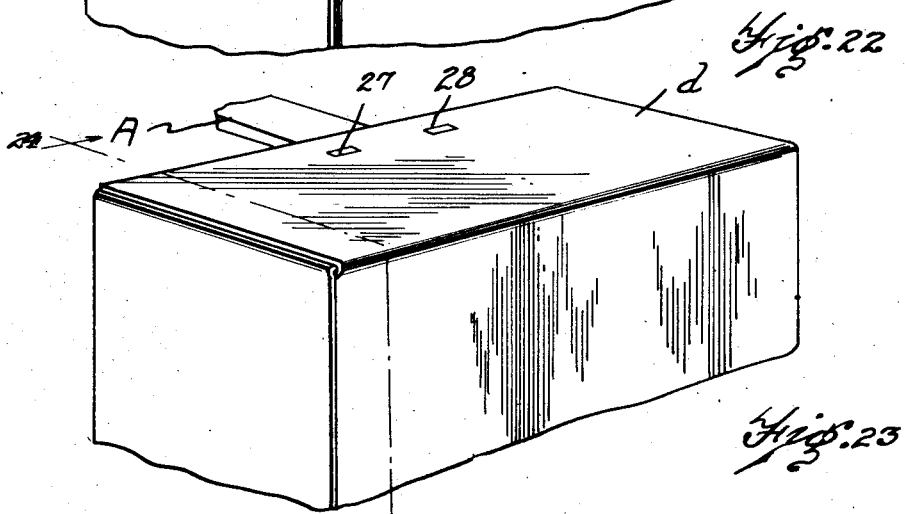
Figure 24:
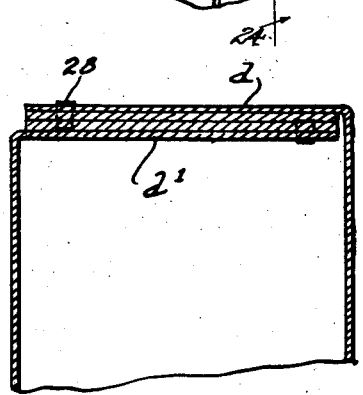
Fig. 24 is a section on the line 24—24 of Fig. 23.

Figs. 20 to 24 inclusive show a variation of the one blank case already described. Here the case is set up and preferably one stitch is taken on each side which is designated S. This stitches the corner flaps *h* to the side walls in the same way as described in connection with the first box, but instead of stitching together the flaps at the opposite end of the case; first these stitches are taken, then a whole line of stitches *x* are taken down each side of the case, and this securely stitches the cover side wall *c—l* to the body of the case. This stitching of the line of stitches *x* is preferably taken after the box is filled with clothing; of course it can be taken before and the goods loaded in from the end. Then to finally seal the case, it is turned up on its end, as shown in Fig. 21, and the anvil A is inserted under the end wall *d—l* with the superimposed corner flaps *f*; or for that matter, the end wall *d* might be turned in first and then the corner flaps *f*. Then, however, the stitches 25 and 26 would have to be taken at the other side. But pursuing the stitching shown in Fig. 21: Next the corner flaps *f—l* are turned down, as shown in Fig. 22, and finally the end *d*, and the final stitches 27 and 28 are taken with the anvil A under the flaps *f—f*, and consequently the stitching being through three thicknesses.

It will be obvious that variations in the stitching may be made within a considerable latitude without departing from the principle of the invention, which is here illustrated in several forms and with a character of stitching which is calculated to set up and seal a box with a minimum number of stitches. "Telescoping" is used in the claims to cover both the two separate section box or the two hinging section box. The body section is of course, the inner or bottom section, and the cover section is the outer or upper section.

What I claim is:

1. A suit box of the character described, comprising body and cover members which telescope together, the body member being provided with folded-over corner flaps and the cover member having corner flaps and telescoping over the body member and sealed thereto by driving stitches through the corner flaps of the cover member and the corner flaps of the body member, said stitches also serving to set up the cover member.

2. A suit box of the character described, comprising a cover member and body member that telescope together and in which the body member is provided with side walls with corner flaps on the outside of the body member that are stitched at their ends to other portions of the body member to leave an intervening space between the stitch and the corner of the body for the insertion of an anvil, the box being sealed by stitching the cover member to the corner flaps with a blade anvil inserted in such aforementioned spaces.

3. A suit box of fibre board or the like, comprising a cover member and a body member that telescope together, said body member having side walls and end walls, a corner flap on at least one of the walls which folds around a corner and abuts against an adjacent wall and which is stitched near its end to said adjacent wall to leave an intervening space between the stitch and the said corner, the box being sealed by a stitch taken through the cover and the said corner flap with a blade anvil inserted in the said intervening space.

4. A suit box of the character described, having in combination a body and cover members which telescope together and in which the body member has two pair of outside corner flaps, one pair at each end, the said two pairs of corner flaps being stitched to the remainder of the body at points removed from the place where the flaps are connected to the blank; and in which the cover is set up at one end by co-incidentally stitching corner flaps thereon to adjacent portions of the cover and also to a pair of the corner flaps of the body member between the stitching of the said flaps and the place where the flap is connected to the blank.

5. A suit box of the character described, the combination of body and cover members which telescope together and in which the body member has two pair of outside corner flaps, one pair at each end, the said two pairs of corner flaps being stitched to the remainder of the body leaving anvil receiving spaces, and in which the cover is set up at one end by co-incidentally stitching corner flaps thereon to adjacent portions of the cover and also to a pair of the corner flaps of the body member for sealing the box, and in which the cover is also stitched to the remaining two corner flaps of the body member.

In testimony whereof I affix my signature.

HERBERT R. BLISS.